(12) United States Patent
Talwar et al.

(10) Patent No.: US 7,421,500 B2
(45) Date of Patent: Sep. 2, 2008

(54) GRID COMPUTING CONTROL SYSTEM (75) Inventors: Vanish Talwar, Mountain View, CA (US); Sujoy Basu, Mountain View, CA (US); Rajendra Kumar, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 995 days.

(21) Appl. No.: 10/340,436

(22) Filed: Jan. 10, 2003

(65) Prior Publication Data
US 2004/0139202 A1 Jul. 15, 2004

(51) Int. Cl.
*G06F 15/16* (2006.01)
(52) U.S. Cl. .................. 709/227; 709/223; 709/226
(58) Field of Classification Search ........... 709/220, 709/223, 226, 227
See application file for complete search history.

(56) References Cited

U.S. PATENT DOCUMENTS

| | | | | |
|---|---|---|---|---|
| 6,158,010 | A * | 12/2000 | Moriconi et al. | 709/223 |
| 6,205,466 | B1 * | 3/2001 | Karp et al. | 709/223 |
| 6,678,828 | B1 * | 1/2004 | Pham et al. | 726/2 |
| 2002/0143923 | A1 * | 10/2002 | Alexander | 709/223 |
| 2004/0044718 | A1 * | 3/2004 | Ferstl et al. | 709/200 |
| 2004/0128374 | A1 * | 7/2004 | Hodges et al. | 709/223 |
| 2005/0166041 | A1 * | 7/2005 | Brown | 713/150 |
| 2006/0294238 | A1 * | 12/2006 | Naik et al. | 709/226 |

* cited by examiner

*Primary Examiner*—Phuoc H Nguyen (57) ABSTRACT

Embodiments of the present invention provide a method for grid computing access control and a system thereof. A command is received from a user. The authorization of the user to execute the command is verified. A system parameter is monitored during execution of the command.

7 Claims, 8 Drawing Sheets

```
% EXAMPLE OF ACCOUNT POLICY
% FILES

% LIST OF DISALLOWED
%EXECUTABLES

KILL
BASH
LN
XTERM
RM
TCSH
PASSWD
FINGER
TELNET
NETSTAT
```

```
% EXAMPLE OF ACCOUNT POLICY
% FILES

% LIST OF DISALLOWED FILES

/ETC/*
/USER/LOCAL/MMGRID/*
/SBIN/*
/SYSTEM/*
/USER/SYSTEM/*.C
```

```
% EXAMPLE OF SESSION POLICY
% FILES

% POLICY MAX VALUE
% DEFAULT_ACTION

NUM_PROCESSES 10 KILL

USAGE_TIME 60 KILL
```

```
% EXAMPLES OF QUALITY OF
% SERVICE POLICY FILES

% APPLICATION-CLASS
% APPLICABLE FRAME RATE

ENGINEERING -10 FRAMES/SEC

VIDEO -30 FRAMES/SEC

GAMES -10 FRAMES/SEC
```

GRID COMPUTING CONTROL SYSTEM

FIELD OF THE INVENTION

Embodiments of the present invention relate to a grid computing environment, and more particularly to access control and account management of an interactive session.

BACKGROUND OF THE INVENTION

Grid computing is a method of harnessing the power of many computational resources in a network. Grid computing is a distributed computer infrastructure involving large-scale sharing, innovative applications and/or high performance processing and network bandwidth.

Figure 1:
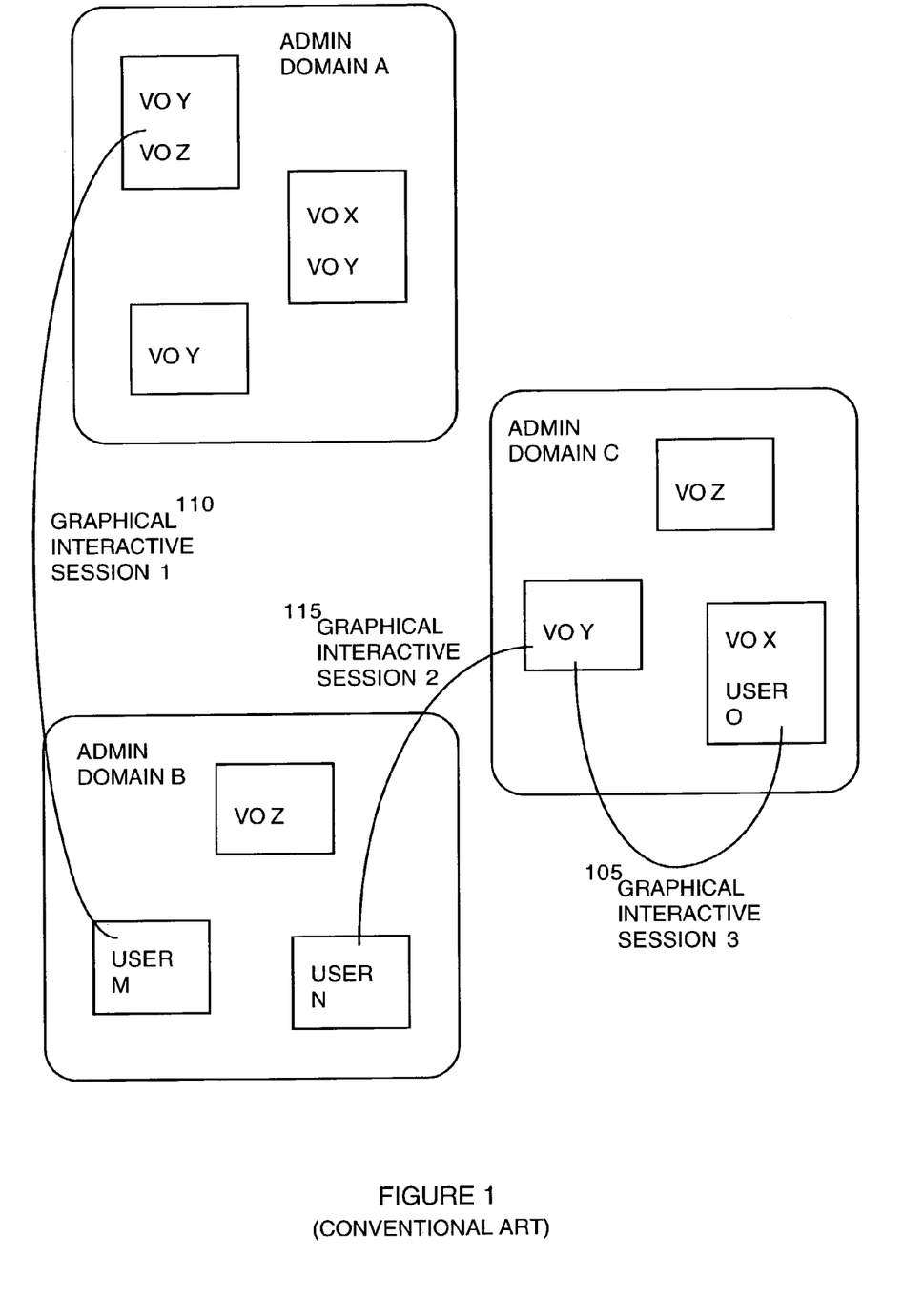
FIG. 1 shows a grid computing environment according to the conventional art.

Referring to FIG. 1, a grid computing environment according to the conventional art is shown. As depicted in FIG. 1, the grid computing environment comprises a plurality of heterogeneous computing nodes distributed across multiple administrative domains. Multiple virtual organizations (e.g., VO X, VO Y, VO Z) exist over the heterogeneous nodes. A node (hereinafter also referred to as a computing resource) may be a part of several virtual organizations. An end-user (e.g., USER M, USER N, USER O) may need to access remote nodes either in the same administrative domain 105 or across domains 110, 115, and may desire interactive sessions with these nodes.

The interactivity may be either graphical or text-based. Exemplary interactive session may include, graphics visualization applications, engineering application like computer aided design or mechanical computer aided design (CAD/MCAD), digital content creation, streaming media, video games, text editing, command line interactions, e-mail applications, and the like. The end-user should also be able to view the graphical and multimedia output of the submitted jobs and application through such graphical interactive sessions. The interaction of the enduser with the remote node may also involve the execution of both installed applications and user specified binaries.

Traditionally, grid computing has provided for the execution of batch jobs in the scientific and academic community. Batch execution on a grid computing environment requires authentication, authorization, resource access, resource discovery, and other services. In support of batch processing of jobs on a grid computing environment, protocols, services, application programming interfaces, and software development kits have been developed. The conventional method and system are not particularly suited for interactive grid computing sessions.

Access control to remote nodes is challenging in a grid interactive environment. Malicious users might take advantage of the interactivity by identifying and exploiting potential security loopholes. For example, malicious users may be able to submit unauthorized jobs to the remote machine. Session and account management is also challenging in a grid interactive environment. Without access control during an interactive session, an end-user may be permitted unrestricted access time to the remote node. Furthermore, quality of service and/or other performance metrics are difficult to deliver in graphical interactive sessions.

A grid computing infrastructure that can hide the complexities of resource management from the user and that can provide secure graphical and multimedia interactive sessions would be an improvement over the conventional art.

SUMMARY OF THE INVENTION

Embodiments of the present invention provide a method for grid computing access control and a system thereof. In one embodiment, a command is received from a user. The authorization of the user to execute the command is verified. A system parameter is monitored during execution of the command.

BRIEF DESCRIPTION OF THE DRAWINGS

The present invention is illustrated by way of example and not by way of limitation, in the figures of the accompanying drawings and in which like reference numerals refer to similar elements and in which.

Prior Art

DETAILED DESCRIPTION OF THE INVENTION

Reference will now be made in detail to the embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it is understood that the present invention may be practiced without these specific details. In other instances, well-known methods, procedures, components, and circuits have not been described in detail as not to unnecessarily obscure aspects of the present invention.

Embodiments of the present invention provide an access control system supporting graphical interactive sessions on a grid computing environment. In one embodiment, the access control system comprises a grid interactive shell and a grid monitoring system. The grid interactive shell restricts access permission to execute requested applications and commands submitted interactively by an end-user. The grid interactive shell may also check system resources for provisioning quality of service guarantees before allowing an application to run. The grid monitoring agents monitor the system and session parameters so as to enforce the access control policies during a graphical interactive session.

In another embodiment, the grid computing control system comprises a grid interactive shell, for receiving a request to execute a command and/or application on a computing resource, a grid monitoring system, and a plurality of system policy files. The grid interactive shell is coupled to an operating system of the computing resource. The grid monitoring system is coupled to the interactive shell and the operating system of the computing resource. The plurality of system policy files are coupled to the grid interactive shell and the grid monitoring system.

In one embodiment, the grid interactive shell comprises a command interpreter, for parsing said command. An access control subsystem, for verifying a first plurality of system and session parameters, is also provided by the grid interactive shell. In one embodiment, the access control subsystem comprises one or more modules such as an executables and file access control module, a user binaries module, a session access control module, a quality of service access control module, and/or the like.

In one embodiment, the grid monitoring system comprises a plurality of monitoring agents, for monitoring a second plurality of system and session parameters. The grid monitoring system also includes a log file, for recording a plurality of system and session data. In one embodiment, the grid monitoring system comprises one or more modules such as a session specific policy module, a quality of service guarantees module, an intrusion detection module, an intrusion prevention module, and/or the like.

Figure 2:
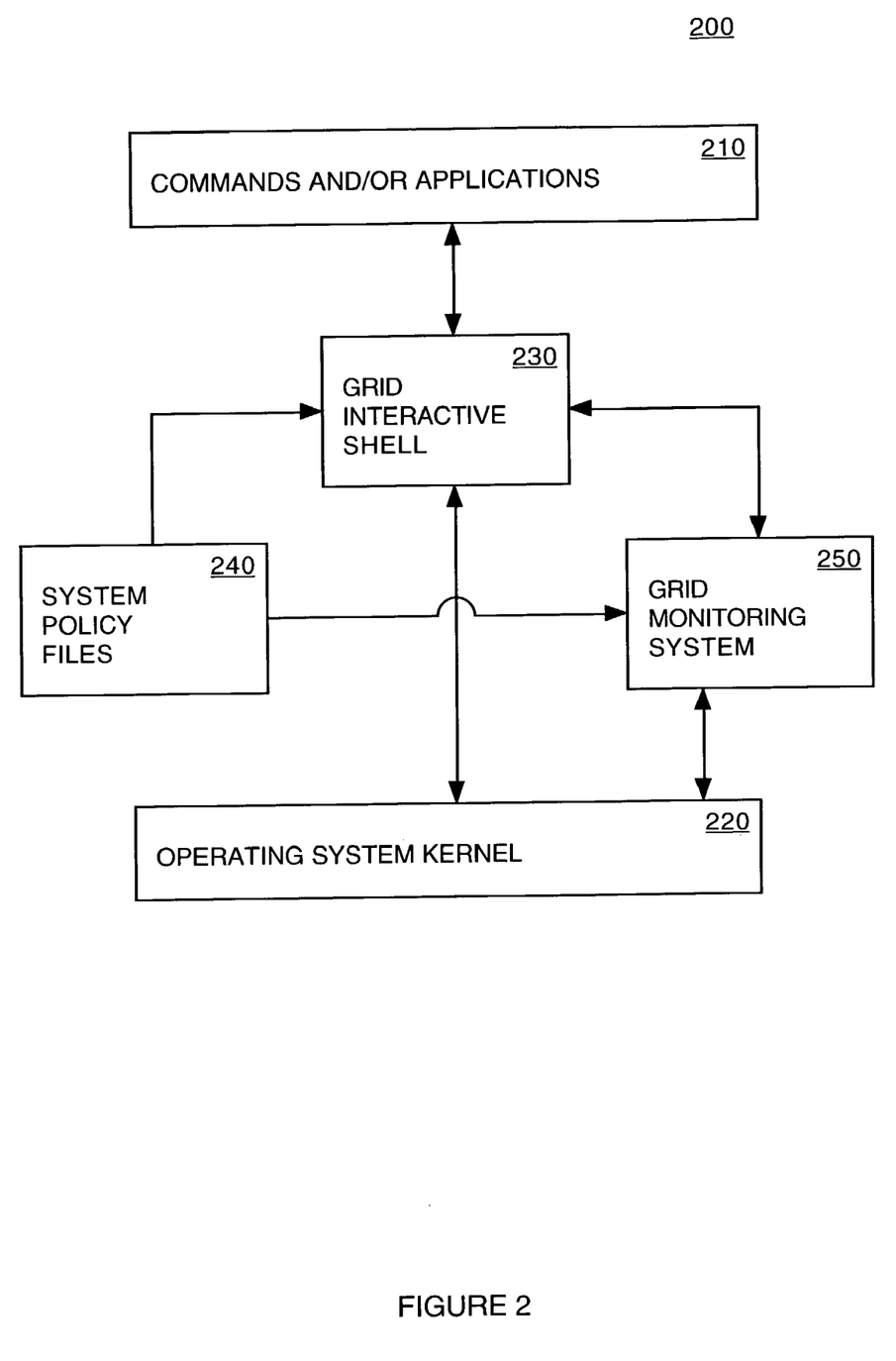
FIG. 2 shows a block diagram of a system providing access control for graphical interactive sessions in a grid computing environment, in accordance with one embodiment of the present invention.

Referring now to FIG. 2, a block diagram of a system 200 providing access control for graphical interactive sessions in a grid computing environment, in accordance with one embodiment of the present invention, is shown. As depicted in FIG. 2, access control, between commands and/or applications 210 and an operating system kernel 220, is provided by a grid interactive shell 230, system policy files 240 and a grid monitoring system 250.

In the present embodiment, the access control system 200 provides end-users an interactive shell called the grid interactive shell 230. The grid interactive shell 230 restricts access permission to execute requested applications and commands submitted interactively by an end-user. The grid interactive shell 230 may also allow end-users to log onto a remote node. The grid interactive shell 230 may also check system resource for provisioning quality of service guarantees before allowing an application to run.

The grid monitoring system 250 provides for actively monitoring the system and session parameters so as to enforce session, application, and user policies during execution of user requested commands and/or applications. In an optional feature of the present embodiment, the grid monitoring system 250 also interfaces with the grid interactive shell 230, to provide relevant system and session information. The system and session information enables the grid interactive shell 230 to make access control decisions based on dynamic information gathered from the system.

The system policy files 240 are used by the grid interactive shell 230 and the grid monitoring system 250 to enforce the access control policies. The system policy files contain policy rules and data for each session and/or user.

Figure 3:
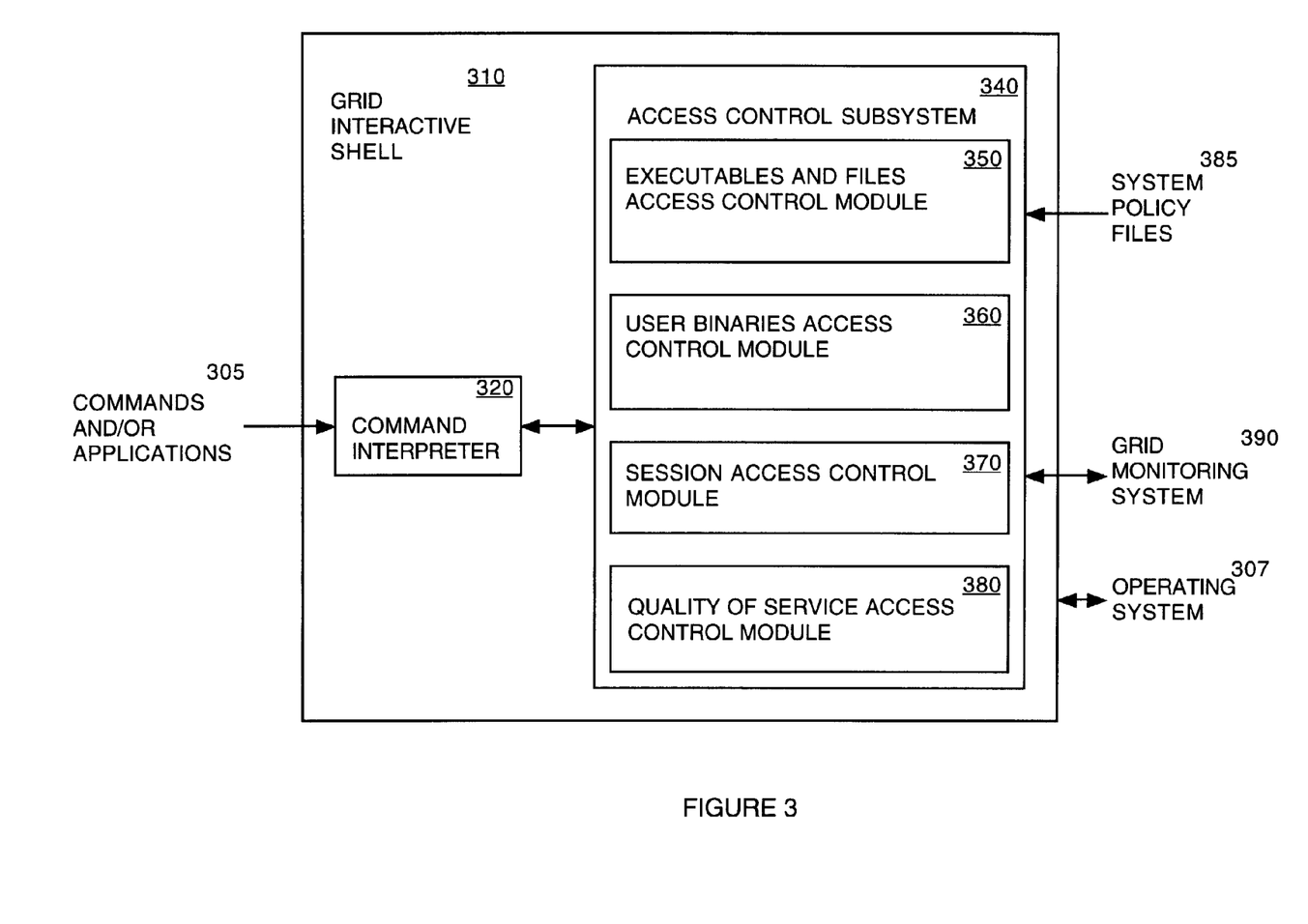
FIG. 3 shows a block diagram of a grid interactive shell, in accordance with one embodiment of the present invention.

Referring now to FIG. 3, a block diagram of a grid interactive shell 310, in accordance with one embodiment of the present invention, is shown. As depicted in FIG. 3, the grid interactive shell 310 comprises a command interpreter 320 and an access control subsystem 340. The grid interactive shell 310 is an extension to a command shell. The grid interactive shell 310 accepts commands for execution. The grid interactive shell 310 also accepts requests to execute applications that are already installed on the remote machine by a system administrator. The grid interactive shell 310 may also accept request to execute applications that are not already installed on the remote machine and are user specified binary files. A request to execute an application may be given in the form of a command.

During an interactive session, an end-user submits a request to start a command or application 305 to the grid interactive shell 310. The command 305 is first parsed by the command interpreter 320, and then passed onto the access control subsystem 340. The access control subsystem 340 performs various access control checks. If one or more access control checks fail, a failure message is returned back to the user and the request to start the application and/or command is denied. If the access control subsystem checks succeed, then the command and/or application is started by the grid interactive shell and the graphical output, if any, can be viewed through a remote graphical display.

The access control subsystem 340 may comprise a plurality of modules such as: an executables and files access control module 350, a user binaries access control module 360, a session access control module 370, a quality of service access control module 380, and/or the like. The executables and files access control module 350 verifies that the requested command and/or application does not belong to a list of disallowed executables, is not invoked with a list of disallowed arguments and/or options, and/or does not access disallowed files and directories. The executables and files access control module 350 may also attempt to determine the files and directories that would be accessed, and compares them with the list in the system policy file 385. In an optional feature of the present embodiment, verification may be enforced through the system policy file 385, which enumerates the list of disallowed executable, disallowed executable arguments, disallowed files, and/or disallowed directories for the user.

The user binaries access control module 360 is responsible for verifying a trusted signature for user specified binaries. A user binary is typically an application that the user wishes to load onto a grid resource. The module checks a user signature from an existing trusted service. Alternatively, if an existing trusted service is unavailable to the user, the present embodiment may provide a virtual machine environment for executing the user's binaries. The decision to allow a virtual machine environment may be controlled based on a system policy file 385 for the user.

The session access control model 370 verifies that the requested command and/or application does not violate session specific policies, such as usage time for the session, maximum number of processes and/or applications launched during the session, maximum number of socket connections allowed during the session, and/or maximum disk quota used during the session. In an optional feature of the present embodiment, the grid interactive shell 310 may be provided with the current usage values for these parameters by the grid monitoring system 390. In another optional feature of the present embodiment, the policy and actions to be taken on violation of the session policies may be specified in another system policy file 385.

The quality of service access module 380 verifies that the requested command and/or application would not violate quality of service guarantees for itself and/or other running jobs. The module verifies that system resources are available to meet quality of service guarantees for the requested command and/or application. If the requested application cannot be provided sufficient system resources, the quality of service access module 380 may deny access to execute the application and notify the user of the failure.

In an optional feature of the present embodiment, another system policy file 385 may be utilized to determine quality of service levels. A system policy file 385 may contain information about the acceptable quality of service guarantee levels for each application. Each such quality of service guarantee levels would translate to specific system resource requirements.

In another optional feature of the present embodiment, if an advance reservation is in place for the interactive session, the quality of service access module 380 may first verify if executing the requested command and/or application with the quality of service guarantee requirement level, will exceed the advanced reservation limits. If so, or if there is no advance reservation in place, the quality of service access control module can interface with the grid monitoring system 390 to determine the system load and estimated system availability information. If the estimated available resources can accommodate the requested application, at an acceptable quality of service level, then the quality of service access module 380 would allow access to execute the application. The quality of service access module 380 may also provision and reserve the resources for the application, based on a policy decision.

Figure 4:
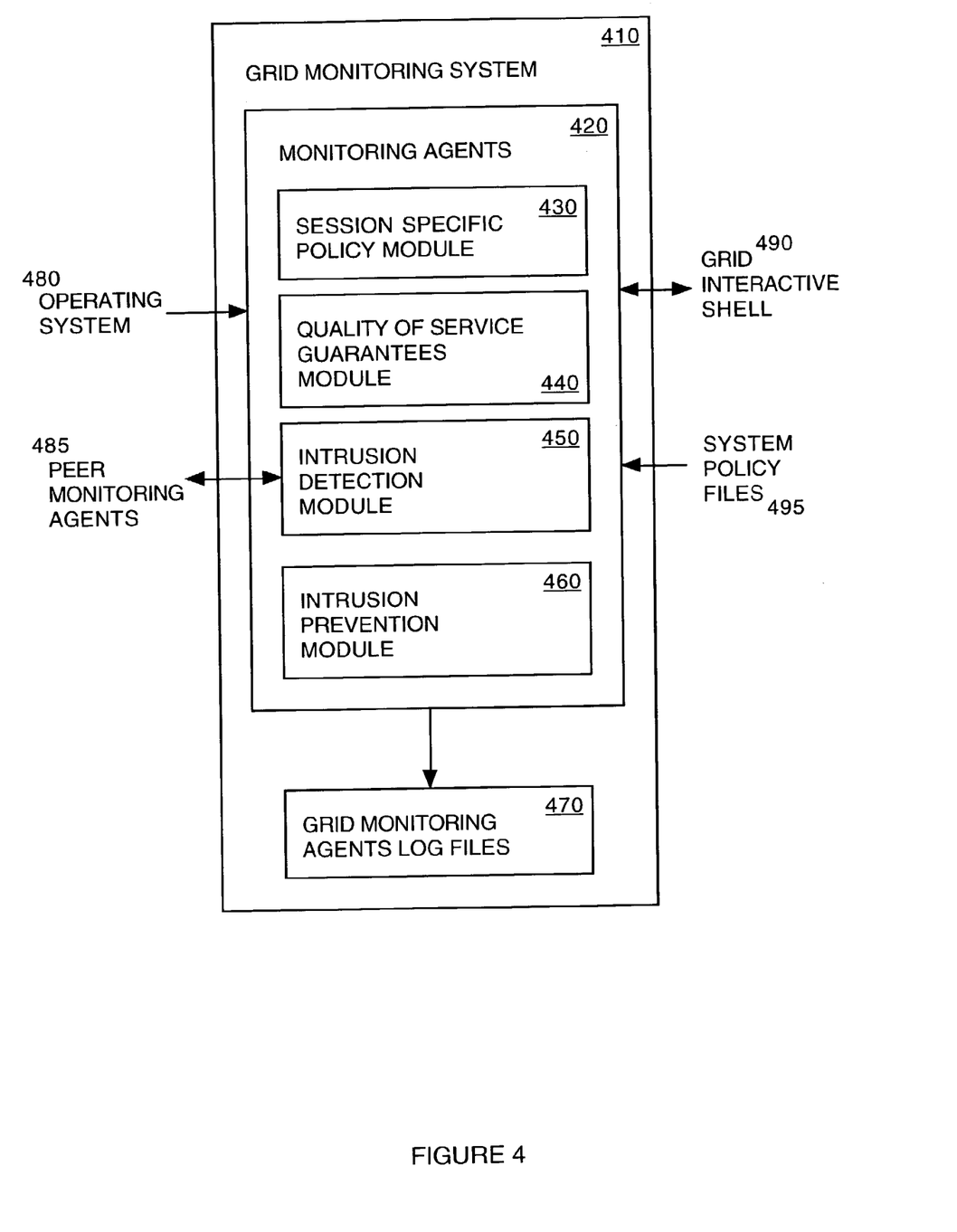
FIG. 4 shows a block diagram of a grid monitoring system, in accordance with one embodiment of the present invention.

Referring now to FIG. 4, a block diagram of a grid monitoring system 410, in accordance with one embodiment of the present invention, is shown. As depicted in FIG. 4, the grid monitoring system 410 comprises monitoring agents 420. The grid monitoring system 410 may also comprise a grid monitoring agents log file 470. The grid monitoring agents 420 may comprise a plurality of modules such as: a session specific policy module 430, a quality of service guarantees module 440, an intrusion detection module 450, an intrusion prevention module 460, and/or the like. Some of the agents 430-460 may be associated with a specific session, while others may be system wide agents that monitor all the sessions started through the grid interactive shell 490. The agents 430-460 may also log their information in log files 470, as well as interface to the grid interactive shell 490, other peer monitoring agents 485, other monitoring systems (not shown) and/or the like, as needed.

The session specific policy module 430 monitors session specific parameters. Session specific policies may include specific policies such as usage time for the session, number of processes spawned during the session, number of socket connections opened during the session, disk quota usage for the session, central processing unit usage for the session, and/or the like. The session specific policy module 430 may utilize the system policy files 495 to determine acceptable limits. The system policy files 495 may for example define the maximum usage limits of these parameters. In an optional feature of the present embodiment, if the session specific policy module 430 observes a violation of the defined session policies, an appropriate action may be taken as defined in the system policy files 495.

The quality of service guarantees module 440 is responsible for monitoring and enforcing the quality of service guarantees for commands and/or applications. The quality of service guarantees module 440 monitors parameters such as central processing unit utilization, network bandwidth available for each application, and/or the like. In an optional feature of the present embodiment, the module 440 may also interface with the grid interactive shell quality of service module and respond to requests made thereby.

The intrusion detection module 450 monitors parameters such as internet protocol (IP) addresses of incoming connections, transmission control protocol (TCP) connection information, and/or the like. In an optional feature of the present embodiment, the intrusion detection module 450 may also interface with peer agents on other grid enabled machines. Interfacing with peer agents allows the agents to share intrusion detection information, thus forming a distributed intrusion detection system for grid environments.

The intrusion prevention module 460 monitors parameters such as IP addresses of outgoing connections and/or the like. The intrusion prevention module 460 may selectively block connections to certain IP addresses as a precautionary measure to prevent possible intrusion and spreading of worms/viruses to other nodes. Hence, the intrusion prevention module 460 serves to prevent intrusion from hacked or malicious binary code started by the grid user on the remote node.

Upon a violation of policies, the monitoring agents 420 may send a signal to the grid interactive shell 490 whereby an appropriate action is taken. An exemplary default action may be to terminate all the processes started during the session and thereafter end the session.

Figure 5:
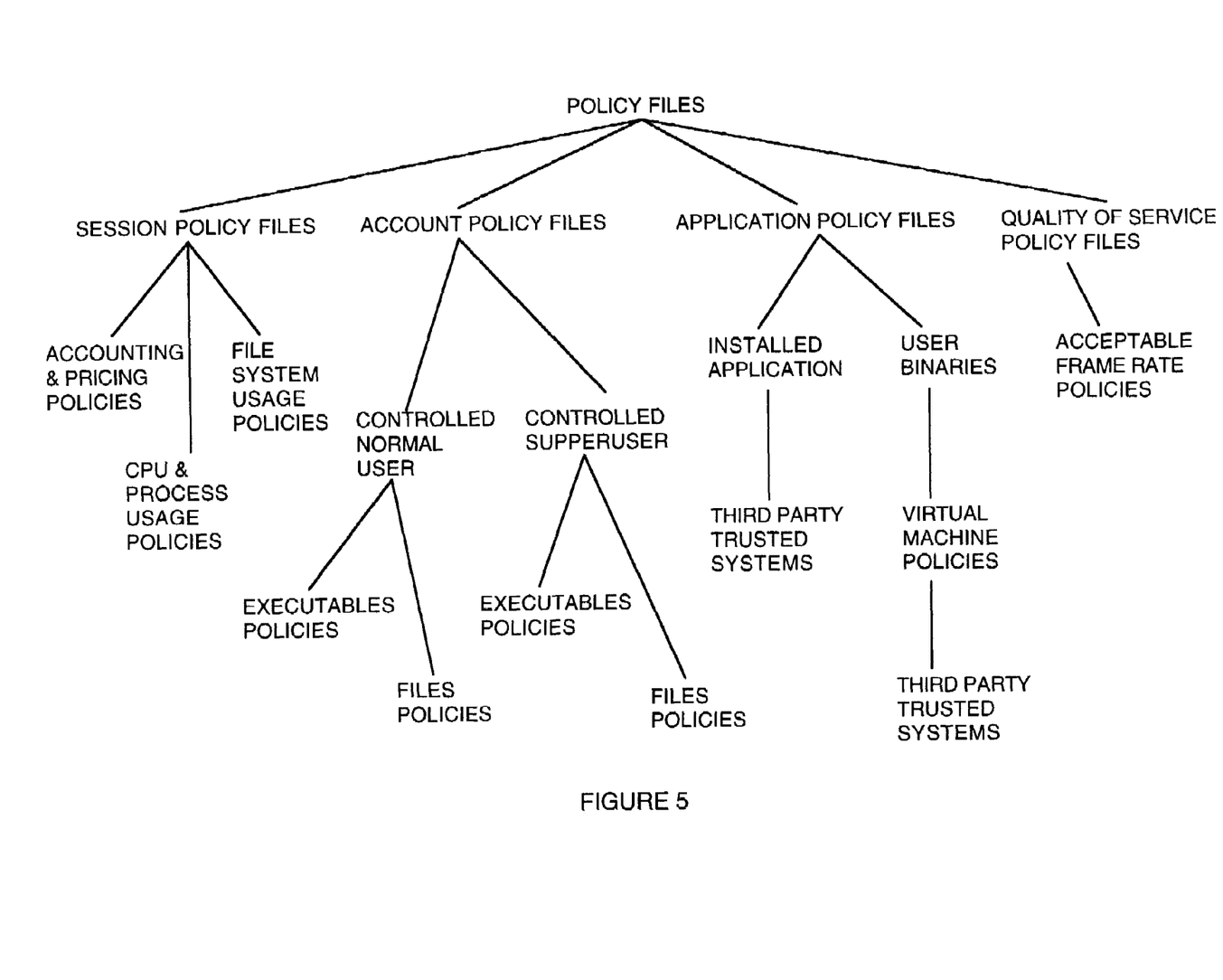
FIG. 5 shows a diagram of system policy file classifications, in accordance with one embodiment of the present invention.

Referring now to FIG. 5, a diagram of system policy file classifications, in accordance with one embodiment of the present invention, is shown. As depicted in FIG. 5, the system policy files may be classified into the following categories: session policy files, account policy files, application policy files, quality of service policy files, and/or the like.

The system policy files are controlled by a system administrator. Furthermore, each of the policy files may be customized for a given user of the system. The session policy files contain policy information for each session. Exemplary policies are accounting and pricing policies, central processing and process usage policies, file system and disk quota usage policies. The policy files may also specify the default action to be taken on a violation of these policies.

The account policy files may contain policy information associated with account pools. There may be separate policies for controlled normal users and controlled super users. The operating system of a particular computing resource provides for normal users and super users. The access of the normal user and super user are each restricted by applicable access control policy files, resulting in controlled normal users and controlled super users. Exemplary policies may include a list of allowed executables and files for a given account pool that a controlled normal user or controlled super user may access on a given computing resource.

The application policy files contain policy information for applications that would be started by the grid environment. There may be two kinds of applications, installed applications and user specified binaries.

The quality of service policy files may contain information for quality of service metrics. An exemplary quality of service metric for graphical sessions to remote nodes may comprise a minimum frame rate. Each acceptable frame rate requirement may translate to specific quality of service requirements for the application and the remote display server on the remote node.

Figure 6:
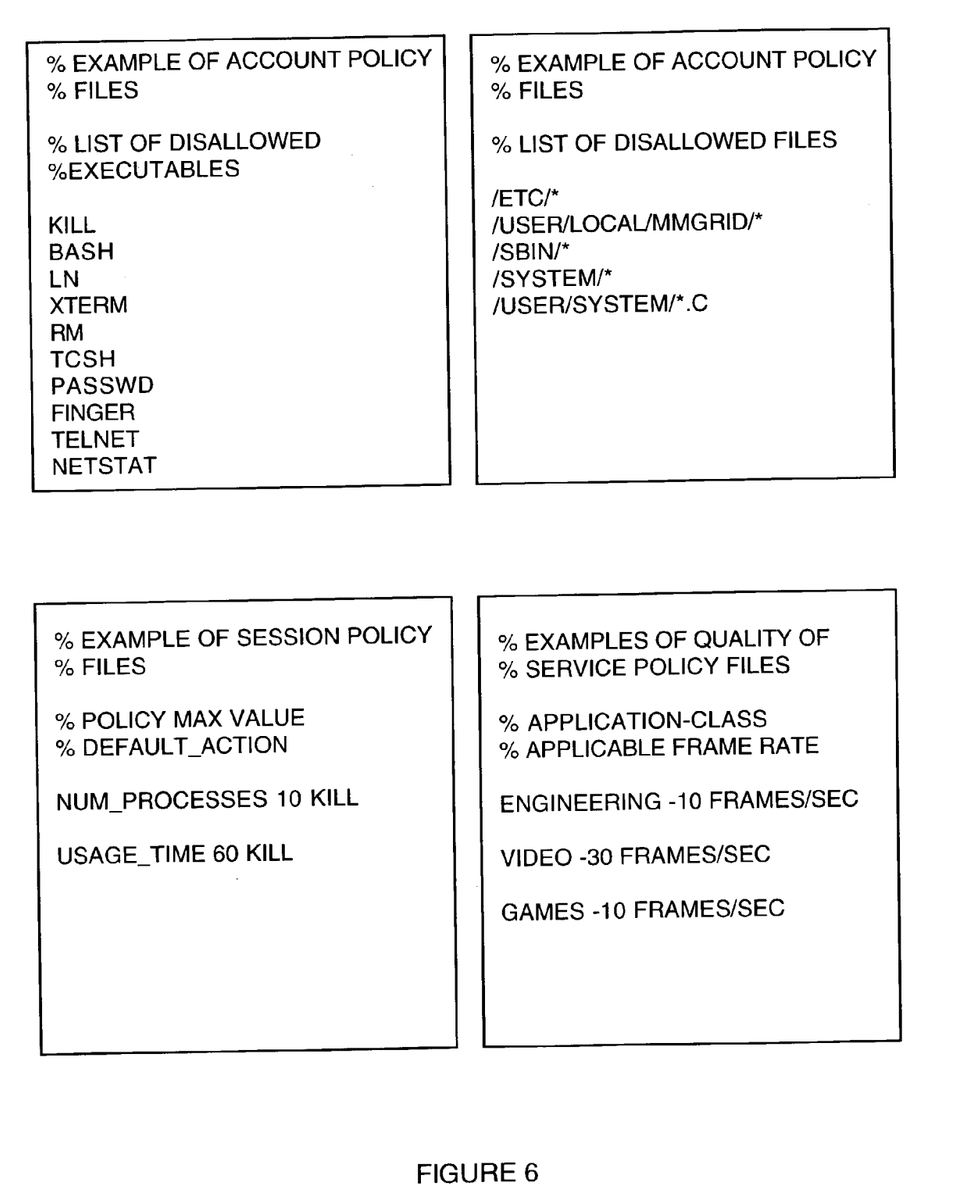
FIG. 6 shows system policy files in accordance with an exemplary embodiment of the present invention.

Referring now to FIG. 6, system policy files in accordance with an exemplary embodiment of the present invention is shown. As depicted in FIG. 6, the exemplary policy files include account policy files, a session policy file, and a quality of service policy file. The exemplary account policy files include a list of disallowed executable and a list of disallowed files. The exemplary session policy file includes a session max value and a default action. The exemplary quality of service policy file includes an acceptable frame rate for various application classes.

Figure 7A:
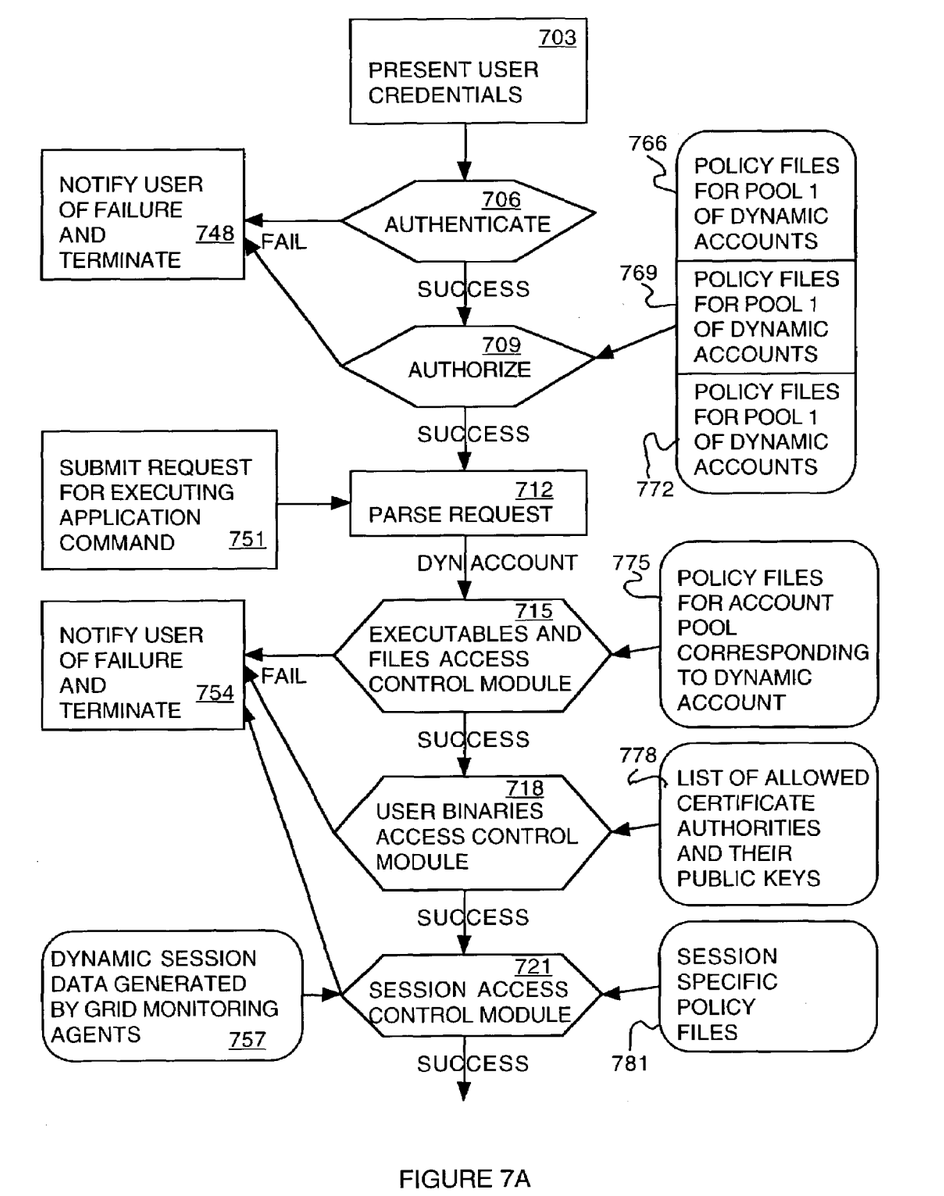
FIGS. 7A-7B show a flow diagram of a process performed by an access control system, in accordance with one embodiment of the present invention.
Figure 7B:
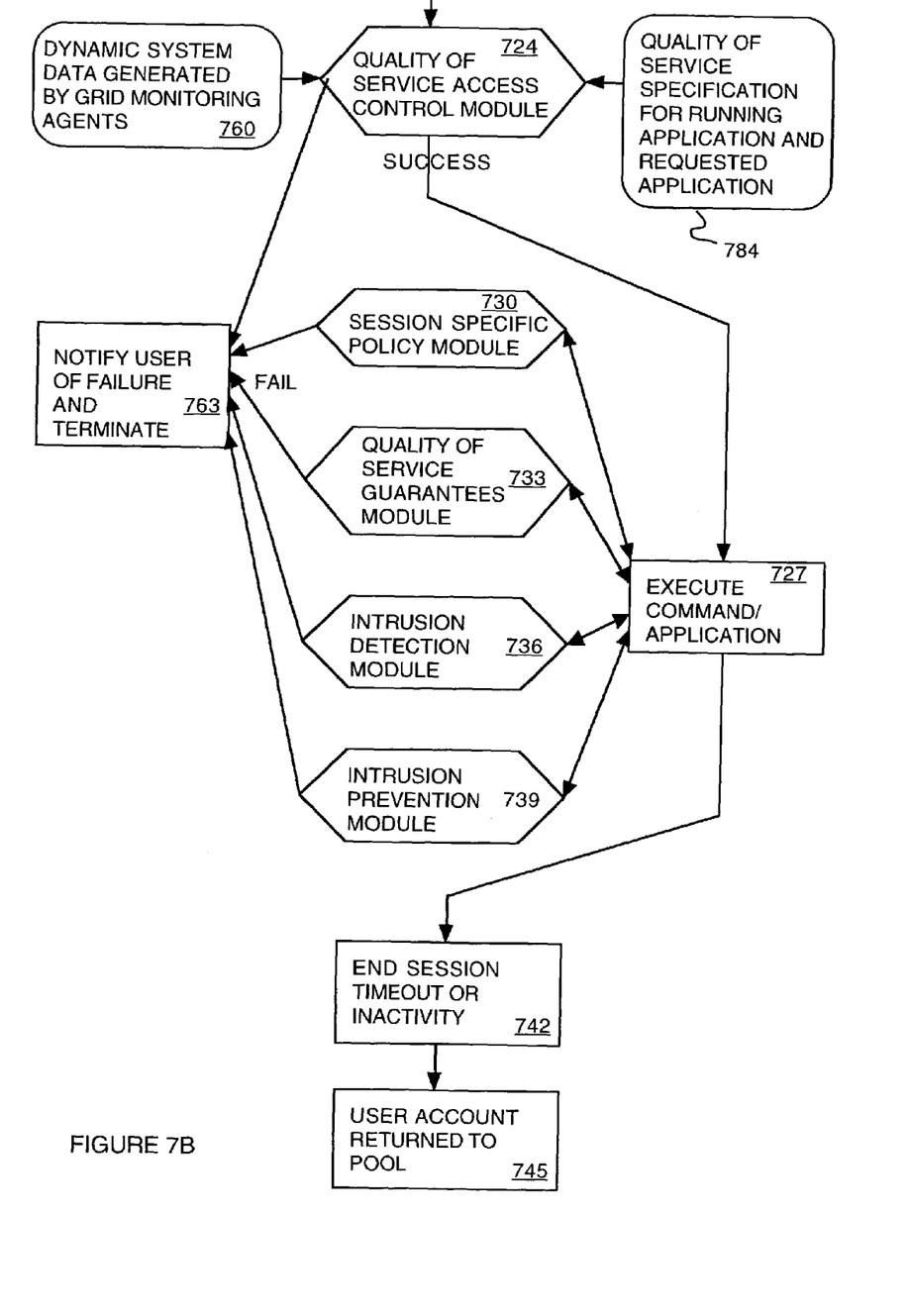

Referring now to FIGS. 7A-7B, a flow diagram of a process performed by an access control system, in accordance with one embodiment of the present invention, is shown. As depicted in FIGS. 7A-7B, the account management process begins with a user presenting credential to a middleware infrastructure, at step 703. The user's credentials are authenticated at step 706. Authentication may require that the end-user previously requests and obtains a grid certificate. An authentication manager mutually authenticates the user with various computing resources in the grid.

The grid environment uses dynamic and/or template accounts to provide resource virtualization for the grid environment. The scalability and manageability of the system is enhanced if grid users are not required to have personal user accounts on each computing resource that are a part of the grid. Instead, a system administrator adds the user once to a directory maintained by the virtual organization in which the user has obtained membership. For organizational account, an entry may be added once for the organization in the directory. An organization account is an organization wide common account shared by all the member of the virtual organization.

Upon a successful authentication, an appropriate account pool for the user is determined, at step 709. Each pool is associated with a set of policy files, which are customized to the target users of the particular pool. As a result, a dynamic account for the requested session is established for the authorized user. The selection of a pool and the binding of the user to an available dynamic account from that pool may be based on the grid credentials presented.

Any node that participates in a given virtual account will check the user's membership with the directory, and authorize the use as a dynamic account if the user does not have a static account. The dynamic account is chosen from a pool of dynamic accounts maintained for the particular virtual organization. Each dynamic account is a full-fledged account created on the computing resource, but without a permanent real-world user associated with it. Unlike normal user accounts that belong permanently to their real-world owners, a dynamic account is bound to a user temporarily.

After the successful selection and binding of user to a dynamic account, the access control system and the monitoring agents are invoked. A window manager, terminal windows running the grid interactive shell, and other programs specified in the window manager's startup files are started as processes owned by the allocated dynamic account.

In a Linux implementation, a virtual network connection (VNC) server is started or remote display server. The grid monitoring system is also started simultaneously. A web browser of the end-user receives an hypertext markup language (HTML) code containing a VNC applet code snippet for the VNC server. Upon execution of the applet, a VNC connection is established between the end-user's web browser and the remote node. Alternatively, VNCviewer application may be utilized, if it is desired not to use the Java applet based approach. The VNC viewer is preinstalled on the end-user's machine. Upon a successful VNC authentication, the user is presented with a controlled KDE desktop environment containing only the applications and menus the user is allowed to access. The KDE desktop environment is pre-configured by a system administrator for each pool of accounts. Other desktops like gnome could also be provided and customized.

In a Linux implementation, the grid interactive shell may be implemented as an extension to the popular GNU bash shell for Linux. The shell source code is modified so as to include the access control modules. In a Windows implementation, the grid interactive shell may be implemented as an extension of Cygwin open source bash shell. The shell source code is modified to add in the access control modules. The system policy files are implemented as text files stored in the Windows File system. The access control modules read in the system policies from the files.

Upon establishment of a dynamic account for the session, requests for executing a command and/or application submitted 751 by the user is parsed at step 712. The parsed requests are processed by the access control subsystem. The access control subsystem may include an executables and files access control module 715, which verifies that the requested command and/or application does not belong to a list of disallowed executables, is not invoked with a list of disallowed arguments and/or options, and does not access disallowed files and directories. If a request contains a user binary, a user binaries access control module 718 verifies the signature of user specified binaries. A session access control model 721 verifies that the requested command and/or application does not violate session specific policies. A quality of service access module 724 verifies that the requested command and/or application would not violate quality of service guarantees for itself and other running graphics jobs.

If the respective conditions are successfully verified, the process continues with the next step. If the condition is not verified, the user may be notified of the failure and the session terminated (754, 763).

At step 727, if the access control checks succeed, then the command and/or application is started by the grid interactive shell and the graphical output, if any, can be viewed through the remote graphical display.

At steps 730, 733, 736, 739, the execution of the requested command and/or application is monitored. Monitoring may include checking session specific parameters, checking and enforcing the quality of service guarantees, and detecting and/or prevent intrusion. Such monitoring agents 730, 733, 736, 739, may be executed serially and/or in parallel with each other and the command or application being monitored. If the monitoring agents 730, 733, 736, 739 detect a violation, an appropriate action may be taken as defined in a system policy file. Alternatively, the user may be notified of the failure and the session terminated 763.

At step 742, the dynamic account is freed at the termination time agreed upon for the session. After the termination time, the grid monitoring agents may terminate the processes still running with the particular account as owner, and may delete all files owned by the account. The dynamic account is then returned to the pool, at step 745. Alternatively, the grid monitoring agents may archive the files created by the user on a server maintained by the virtual organization. Subsequent sessions for this user would retrieve the files from the archive. The selection of a pool and the binding of the user to an available dynamic account from that pool are based on the grid credentials presented by a user.

Embodiments of the present invention may be practiced as an extension of existing grid middleware infrastructure. Embodiments of the present invention advantageously provide a comprehensive access control methodology for graphical interactive sessions. The access control is in addition to those provided by the operating system. The access control system is modular and rule based allowing for fine grained access control and easy extensibility. The extensibility allows for adding and removing access control modules in the grid interactive shell, or monitoring agents in the grid monitoring system, as appropriate for a particular implementation.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A grid computing control system comprising:
a grid interactive shell, for receiving a command for execution on a computing resource, wherein said grid interactive shell is coupled to an operating system of a computing resource;
a grid monitoring system coupled to said interactive shell and said operating system of said computing resource;
a plurality of system policy files coupled to said grid interactive shell and said grid monitoring system;
a session specific policy module for verifying said command conforms to a quality of service guarantee; and
an access control subsystem comprises one or more modules selected from the group consisting of an executables and files access control module, a user binaries module, a session access control module, and a quality of service access control module.

2. The grid computing control system according to claim 1, wherein said grid interactive shell further receives an application for execution on said computing resource.

3. The grid computing control system according to claim 1, wherein said grid interactive shell comprises: a command interpreter, for parsing said command; and the access control subsystem, for verifying a first plurality of system and session parameters.

4. The grid computing control system according to claim 1, wherein said grid monitoring system comprises:
a plurality of monitoring agents, for monitoring a second plurality of system and session parameters; and
a log file, for recording a plurality of system and session data.

5. The grid computing control system according to claim 4, wherein said plurality of monitoring agents comprises one or more modules selected from the group consisting of said session specific policy module, a quality of service guarantees module, an intrusion detection module, and an intrusion prevention module.

6. A computer readable-medium comprising a plurality of instructions which when executed cause a grid computing resource to execute a resource management process comprising:
verifying a requested command is an allowable executable;
verifying said requested command includes an allowed argument;
verifying said requested command conforms to a session specific policy;
verifying said requested command conforms to a quality of service guarantee;
monitoring compliance with said session specific policy during execution of said requested command;
monitoring compliance with said quality of service guarantee during execution of said requested command; and
verifying said requested command includes a trusted signature, wherein said requested command comprises a user specified binary.

7. The process according to claim 6, further comprising:
monitoring to detect an intrusion during execution of said requested command; and
monitoring to prevent said intrusion during execution of said requested command.

* * * * *

UNITED STATES PATENT AND TRADEMARK OFFICE
CERTIFICATE OF CORRECTION

| | | |
|---|---|---|
| PATENT NO. | : 7,421,500 B2 | Page 1 of 1 |
| APPLICATION NO. | : 10/340436 | |
| DATED | : September 2, 2008 | |
| INVENTOR(S) | : Vanish Talwar et al. | |

It is certified that error appears in the above-identified patent and that said Letters Patent is hereby corrected as shown below:

In column 9, lines 37-38, in Claim 2, delete "an application for execution" and insert -- request to execute an application --, therefor.

Signed and Sealed this

Twenty-eighth Day of July, 2009

JOHN DOLL
*Acting Director of the United States Patent and Trademark Office*